No. 713,793. Patented Nov. 18, 1902.
J. A. OSTENBERG.
EXPLOSIVE ENGINE.
(Application filed Jan. 21, 1901.)

(No Model.) 2 Sheets—Sheet 1.

Witnesses:
Jas. J. Maloney.
Nancy P. Ford.

Inventor,
John A. Ostenberg,
by J. P. and H. J. Livermore
Att'ys.

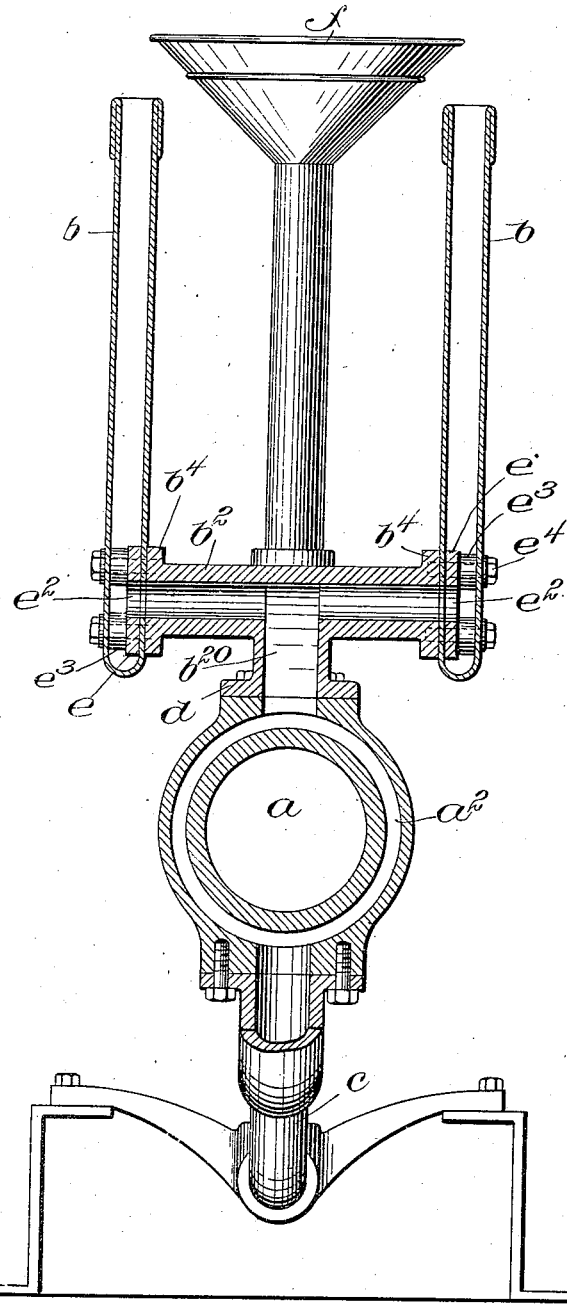

UNITED STATES PATENT OFFICE.

JOHN A. OSTENBERG, OF SAN JOSE, CALIFORNIA, ASSIGNOR TO FREDERICK M. GILBERT, OF WALPOLE, NEW HAMPSHIRE.

EXPLOSIVE-ENGINE.

SPECIFICATION forming part of Letters Patent No. 713,793, dated November 18, 1902.

Original application filed July 14, 1899, Serial No. 723,775. Divided and this application filed January 21, 1901. Serial No. 44,120. (No model.)

*To all whom it may concern:*

Be it known that I, JOHN A. OSTENBERG, of the city of San Jose, county of Santa Clara, State of California, have invented an Improvement in Explosion-Engines, of which the following description, in connection with the accompanying drawings, is a specification, like letters on the drawings representing like parts, this being a division of application Serial No. 723,775, filed July 14, 1899.

The present invention relates to an explosion-engine; and the engine embodying the invention is mainly intended to be used with gasolene or other liquid explosives, although certain features of the invention may be equally well utilized in engines in which gas is to be used as the explosive element.

The main object of the invention is to obtain practical means for water-jacketing a portable explosion-engine of the kind used, for example, in outdoor work, such as sawing wood and the like, where the base of operation is frequently changed. One of the chief obstacles in the way of using an explosion-engine in such work has been the difficulty encountered in cooling the cylinder and explosion-chamber, and the present invention is mainly embodied in means for using a small supply of cold water over and over, the heat taken up by the water being distributed over a large radiating-surface and rapidly dissipated. For this purpose the engine embodying the invention is provided with one or more tanks having a large surface area, but relatively small capacity, the said tanks communicating by a duct or ducts with a water-jacket for the cylinder and being arranged above the cylinder, so that when they are filled with water the cylinder is practically submerged or wholly surrounded by water, the greater portion of the water, however, standing above the cylinder, where it is exposed to the air. As heat is generated, therefore, the water which takes up heat from the cylinder rises from the jacket into the tanks and cooler water goes down to take its place, thus producing a circulation, the warm water which rises in the tanks being rapidly cooled, owing to the large radiating-surface.

Figure 1:
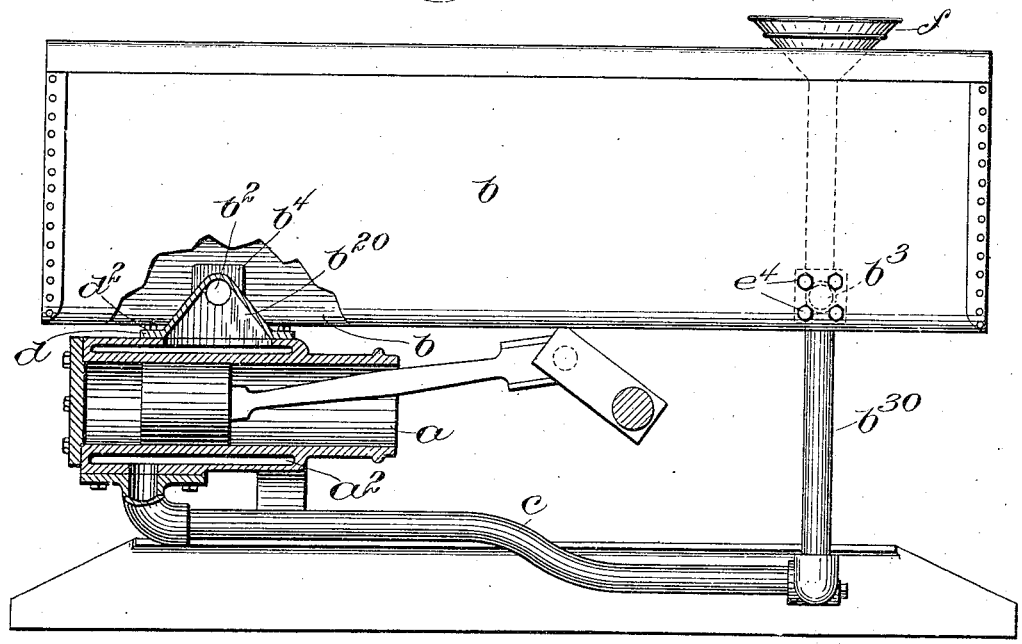
Figure 2:
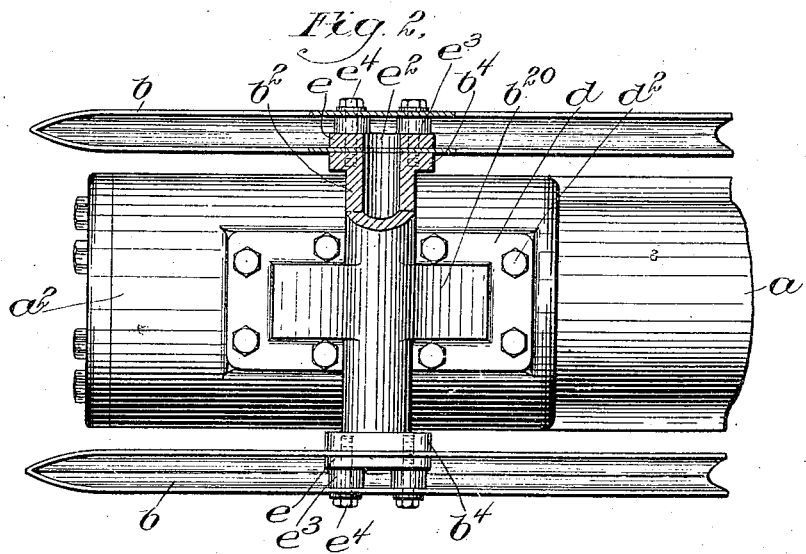

Figure 1 is a longitudinal sectional elevation of an explosion-engine embodying the invention, the cylinder and water-jacket being shown in section and the valve mechanism, &c., omitted, since it forms no part of the present invention; Fig. 2, a partial top plan view, partly in section, drawn on a larger scale; and Fig. 3, a vertical section on the same scale as Fig. 2 of the cooling apparatus and the cylinder.

The invention is shown as embodied in an engine having a cylinder $a$, provided with a water-jacket $a^2$, and the said cylinder is arranged to be cooled by water contained in a tank or tanks $b$, located above the cylinder, the cooling-tanks and the arrangement and construction thereof forming the main feature of the invention.

As herein shown, there are two tanks $b$, preferably made of sheet metal, the said tanks being connected across by pipes $b^2$ and $b^3$, each of which forms a T, the downward branch $b^{20}$ of the pipe $b^2$ communicating directly with the upper portion of the water-jacket, while the downward branch $b^{30}$ of the pipe $b^3$, which is near the opposite end of the tanks, is connected with a pipe $c$, which extend into the water-jacket near the bottoms thereof. The construction at this end of the tanks is substantially the same as that at the other end, which is more fully illustrated in Figs. 2 and 3, except that the pipe $b^{30}$ is extended above as well as below the cross member and has a funnel-shaped inlet $f$ at the top for convenience in filling the tanks. When the tanks are filled with water, therefore, a body of water stands in the pipe system and water-jacket, completely surrounding the cylinder, and as soon as the engine begins to operate and heat is generated the hot water around the cylinder will begin to rise through the pipe $b^2$ and the cool water will pass downward through the pipe $b^3$, so that a circulation is set up, the warm water which rises into the tanks $b$ being rapidly cooled, owing to the large radiating-surface thereof. The current set up causes the water to travel nearly the entire length of the tanks, which, as shown, project a considerable distance beyond the cylinder, so that they are not directly exposed to the heat except near one end. By this construction a few gallons of cold water will suffice to prevent overheating and preëxplosions during a day's run, so that no difficulty is encountered when the engine is moved from place to place, there being no necessity for a continuous water-supply to obtain the necessary cooling medium.

As herein shown, the tanks are mainly supported upon the top of the cylinder, the downward branch $b^{20}$ of the pipe $b^2$ constituting a bonnet which is provided with a flange $d$, secured by the cap-screws $d^2$ to the outer surface of the cylinder, the water-jacket portion of the casting which forms the cylinder being open at this point and the adjacent space closed or completed by the said bonnet when the engine is assembled. To secure the tanks to the ends of the pipes, each cross-pipe is provided with a flange at its end, as $b^4$, Figs. 2 and 3, and inside the tank is a supporting member $e$, (shown as a flat plate,) provided with a central opening $e^2$, corresponding to the bore of the pipe, the wall of the tank having a hole at this point to communicate with the cross-pipe. Each of the said plates $e$ is provided with studs $e^3$, which project outward to the opposite wall of the tank, and the whole is then secured in position by means of cap-screws $e^4$, which extend through the walls of the tank and the plate $e$ into the flanges $b^4$. By this construction the tanks may be inexpensively constructed of sheet metal bent into shape and riveted together and at the same time may be securely fastened to and supported from the pipe system.

It will be seen from the forgoing description that the tanks while having a large radiating-surface are of relatively small capacity, so that a small amount of water will keep the cylinder cool, the heat being rapidly dissipated from the walls of the tanks, so that there is always cool water at the outer ends of the tanks to flow back to the jacket through the pipe $b^{30}$. The metal of which the tanks are made, moreover, may be so thin as practically to retain no heat. While, however, the construction shown is practicable and has the advantage described, it is not intended to limit the invention to such specific construction, since modifications may be made without departing from the invention.

I claim—

1. In an explosion-engine, the combination with the cylinder; of a jacket therefor; a tank of large area and relatively small capacity, the bottom of which is above the top of the cylinder; and communicating passages between said tank and said jacket arranged to set up a natural circulation, substantially as described.

2. An explosion-engine having a cylinder provided with a jacket; an opening in the upper part of said jacket; a bonnet for said opening provided with a tubular cross member; a sheet-metal tank having one wall supported against the end of said tubular cross member; a supporting member within said tank extending from one wall to the other thereof; and fastening devices extending through both walls of said tank and said supporting member into said tubular cross member, substantially as described.

3. In an explosion-engine, the combination with the cylinder; of a jacket surrounding said cylinder and provided with a tubular cross member above the cylinder; tanks supported by said cross member and communicating with said jacket; and a pipe leading downward from said tanks and communicating with the lower portion of said jacket, substantially as described.

4. In an explosion-engine, the combination with the water-jacket; of a sheet-metal tank; a tubular supporting member for said tank communicating with said water-jacket; internal supports extending from one wall of the tank to the other; and fastening devices extending through said internal supports into said tubular supporting member, substantially as described.

5. In an explosion-engine, the combination with a water-jacket for the cylinder; of one or more tanks mounted over the cylinder and projecting beyond said cylinder; the bottoms of the tanks being above the top of the cylinder, a pipe or duct leading directly from the bottom of the tank into the top of the water-jacket; and another pipe or duct leading from the tank near the opposite end thereof back to the bottom of the water-jacket, whereby the heated water rises into the tank and flows through the same, becoming cooled before it again enters the jacket, substantially as described.

In testimony whereof I have signed my name to this specification in the presence of two subscribing witnesses.

JOHN A. OSTENBERG.

Witnesses:
J. F. COLOMBET,
WESLEY PIEPER.